June 3, 1924.

J. M. STRAUB 1,496,684

MANDREL PULLING DEVICE

Filed March 8, 1922

Inventor
John M. Straub.
By Robert M. Pierson
Atty.

Patented June 3, 1924.

1,496,684

UNITED STATES PATENT OFFICE.

JOHN M. STRAUB, OF AKRON, OHIO, ASSIGNOR TO THE B. F. GOODRICH COMPANY, OF NEW YORK, N. Y., A CORPORATION OF NEW YORK.

MANDREL-PULLING DEVICE.

Application filed March 8, 1922. Serial No. 542,144.

*To all whom it may concern:*

Be it known that I, JOHN M. STRAUB, a citizen of the United States, residing at Akron, in the county of Summit and State of Ohio, have invented a certain new and useful Mandrel-Pulling Device, of which the following is a specification.

This invention relates to devices for separating articles, such, for example, as hollow rubber tires, from the cavity-forming mandrels or cores upon which they are formed or vulcanized, and its general object is to provide simple, rapid and powerful apparatus for work of this kind. More specific objects are to save labor, avoid danger to the operator, and to avoid distortion or injury of the article in the pulling operation.

Figure 1:
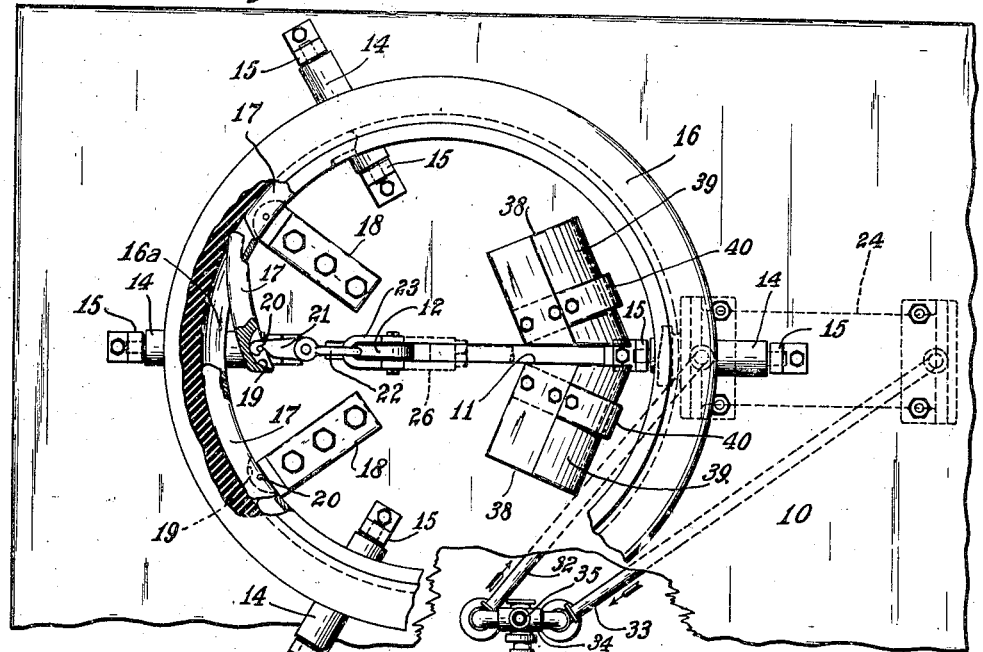
Fig. 1 is a plan view, with parts broken away and in section, of a mandrel pulling apparatus for a cushion tire, embodying a preferred form of my invention.
Figure 2:
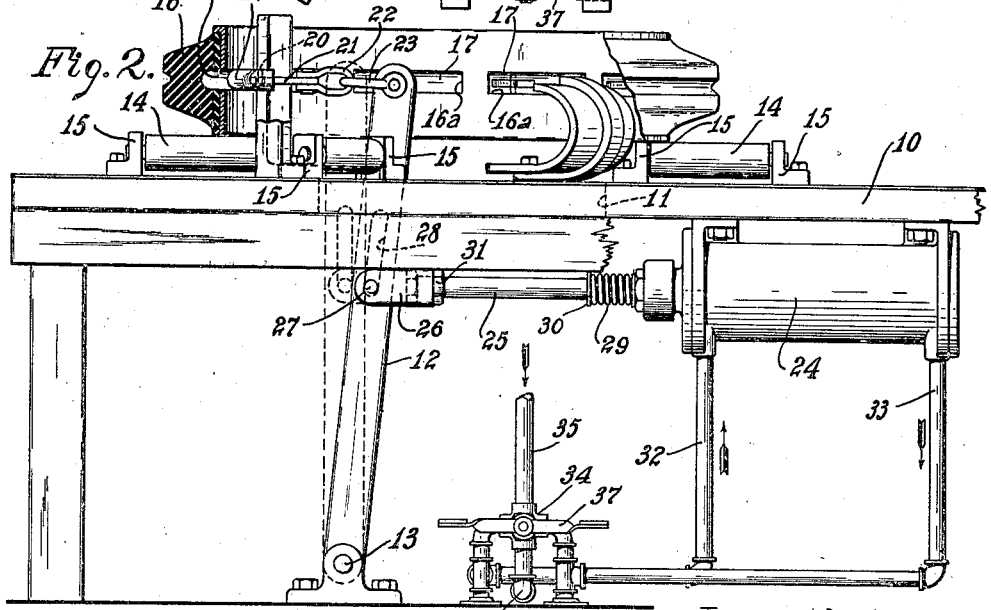
Fig. 2 is an elevation of the same, with parts broken away and in section.

In the drawings, 10 is a table having a slot 11 through which extends the upper end of a lever 12 fulcrumed at 13 on the floor under the table. Positioned in a circle about the slot 11, upon the table 10, is a set of radially disposed work-supporting rollers 14, 14 loosely journaled in pairs of brackets 15, 15 rising from said table, said rollers being adapted to support the work, consisting here of a cushion tire 16, having core-sections 17, 17 therein, and to facilitate its rotation without displacement.

A pair of brackets, 18, 18 are mounted upon the table 10 near one end of the slot 11, on opposite sides thereof, in position to be abutted by the inner periphery of the tire 16, which may be freely received by the rollers 14 and said brackets, and the latter are adapted to hold said tire in place while successive core-sections are pulled therefrom at a position between said brackets. The core-sections, in the particular work here shown, are embedded in the body of the tire adjacent respective slots 16ª, 16ª in the latter's rim, and are so formed that they may be withdrawn from the tire through said slots. Each core-section is formed with a recess 19 (Fig. 1) traversed by an anchor pin 20.

A hook 21 adapted to engage the pin 20 is connected to the upper end of the lever 12 by a link 22 and clevis 23. For actuating the lever 12, a fluid pressure cylinder 24 is secured to the under side of the table 10, at the other end of the slot 11 from the brackets 18, and its piston-rod 25 is provided with a fork 26 at its outer end straddling the lever 12, preferably at a high part thereof, and attached thereto, with a sliding connection, by a pin 27 mounted in the arms of said fork and extending through a longitudinal slot 28 in said lever. 29 is a helical spring mounted upon the piston-rod 25 to receive and brake the force of the latter and connected parts when resistance to its movement, in the mandrel pulling operation, is suddenly broken. 30 is a washer slidably mounted upon said piston-rod between said spring and a nut 31 securing the fork member 26, as a buffer between said spring and nut.

Pipes 32, 33 are provided for supplying fluid pressure to the respective ends of the cylinder 24, said pipes leading off from a four-way valve 34 having a supply pipe 35, from a source of pressure fluid (not shown), and an exhaust 36, said valve being adapted in respective positions to supply fluid pressure to either end of the cylinder while venting the other end thereof. 37 is a two armed foot-lever on said valve for operating the latter, said valve being adapted to be turned to one of the positions suggested by depressing one arm of said lever and to the other position by depressing the opposite arm.

Upon the table 10, at opposite sides of the slot 11, adjacent its end farthest from the brackets 18, are mounted a pair of guards 38, 38, each consisting of a curved metal plate 39 reenforced or backed by a curved bracket 40 which constitutes the mounting for said plate.

Said guards preferably as here shown, are close to but do not overhang the slot 11. Their work-receiving faces are concave and positioned at an angle to each other, so as to avoid deflecting a flying core-section upward or against the inner periphery of the tire. The guards constitute in effect a pocket adapted to receive and stop a core-section thrown from pulling position by the lever 12.

In the operation of the device the tire is laid upon the rollers 14, being lifted over the brackets 18, and preferably is placed with its inner periphery in contact, or nearly in contact, with said brackets, with one of the core sections lying between the brackets 18, and with the anchor pin 20 of said core-section substantially in alignment with the slot 11 and lever 12.

One arm of the valve lever 37 is depressed by the operator's foot, charging the rear end of the cylinder 24 and moving the lever 12 toward said core section, to which it is then connected by means of the hook 21. The latter, together with the link 22 and clevis 23, constitutes a flexible connection of appreciable length, so that a substantially radial pull will be exerted upon the core notwithstanding slight inaccuracies in the positioning of the tire.

Pressures in the cylinder are then reversed, by depressing the other arm of the valve lever, forcing the piston-rod 25 to the right as viewed in the drawings and, through the lever 12 and connected parts, pulling the engaged core-section from the tire. The brackets 18, engaging the tire at two points on its inner periphery, on opposite sides of the point where the pulling force is applied, together with the weight of the tire, securely hold the latter in position.

In case the core-section sticks, the building up of fluid pressure in the cylinder exerts a very strong pull upon it, whereas if the core section yields easily the cylinder applies only such force as is necessary to dislodge it, the force gradually increasing until the core section yields. Because of its gradual increase of force to the amount required for each particular core-section, and its adaptability for applying a very strong pull with a minimum of mechanism, a fluid pressure actuating means is highly desirable in combination with the other features of the device. The rate of increase in the force applied may be predetermined by the size of the conduits and its ultimate amount by the size of the cylinder.

In case the core-section suddenly yields after a high pressure has been built up in the cylinder, and is thrown violently from the tire, the guards 38 receive and stop it, preventing injury to the operator or to the tire or the machine, and the core is brought to rest upon the table within easy reach of the operator.

After the first core-section is pulled the tire is rotated upon the rollers 14 to bring the next core-section into pulling position between the brackets 18, and so the operation is continued.

Modifications may be resorted to without departing from the scope of my invention, and I do not wholly limit my claims to the horizontal position for the work or in other respects to the exact embodiment of the invention here shown.

I claim:

1. A device for pulling a core from an annular article, said device comprising means for holding the article against the pulling force, a pulling member having a portion extending transversely of and substantially to the median plane of the article when the latter is so held, said pulling member being adapted freely to receive an annular article placed thereover, means adapted to connect said portion of said pulling member with the core, and means for actuating said pulling member.

2. A device for pulling a core from an annular article, said device comprising holding means adapted freely to receive the annular article and to engage its inner periphery to hold it against the pulling force, a pulling member having a portion extending substantially into the space surrounded by the article, said pulling member being adapted freely to receive an annular article placed thereover, means for connecting said portion of said pulling member with the core, and means for actuating said pulling member.

3. A device for pulling a core from an annular article, said device comprising a pair of projecting, spaced-apart members adapted to engage with the inner periphery of the article to hold said article against the pulling force, a pulling member having a portion extending in the same general direction as said projecting members and into the space surrounded by the article, said projecting members and said pulling member being adapted freely to receive an annular article placed thereover, means for connecting said portion of said pulling member with the core, and means for actuating said pulling member.

4. A device for pulling a core from an annular article, said device comprising a pair of projecting, spaced-apart members adapted to engage with the inner periphery of the article to hold said article against the pulling force, a pulling member having a portion extending in the same general direction as said projecting members and into the space surrounded by the article, said projecting members and said pulling member being adapted freely to receive an annular article placed thereover, means for connecting said portion of said pulling member with the core, means for actuating said pulling member, and a guard member positioned in the space surrounded by the article and adapted to stop the core when the latter is thrown from said article.

5. A device for pulling a core from an article, said device comprising means for holding the article, a pulling member, non-rigid means for connecting said pulling member with core, yielding means for actuating said pulling member, and a guard member adapted to stop the core when the latter is thrown from said article.

6. Apparatus for pulling a core from an article, said apparatus comprising means for holding the article, a lever, means for connecting said lever with the core, and a fluid pressure cylinder adapted to move said lever.

7. Apparatus for pulling a core from an article, said apparatus comprising means for holding the article, a lever, means for connecting said lever with the core, a fluid pressure cylinder, and a piston and piston-rod therefor, said piston-rod being slidably connected with said lever between its fulcrum and said connecting means and adapted to actuate said lever.

8. A device for pulling cores from an annular article, said device comprising a table, a circular series of radially positioned work-supporting rollers mounted on said table, a pulling member adapted to engage a core in an article mounted on said rollers, and means for actuating said pulling member.

9. A device for pulling cores from annular articles, said device comprising a slotted table, a pair of spaced-apart, upwardly projecting members on said table adapted freely to receive and to engage the inner periphery of an annular article placed on said table, a pulling member having a portion extending upward through the slot of said table, means for connecting said portion of said pulling member with a core in said article, and means for actuating said pulling member.

10. A device for pulling a core from an article said device comprising a slotted table, means for holding said article on said table, a pulling member having a portion extending upward through the slot of said table, means for connecting said portion of said pulling member with a core in said article, and means beneath said table for actuating said pulling member.

11. A device for pulling a core from an article said device comprising a slotted table, means for holding said article on said table, a pulling member having a portion extending upward through the slot of said table, means for connecting said portion of said pulling member with a core in said article, means beneath said table for actuating said pulling member, and a guard member rising from the table and adapted to catch a core thrown from said article by said pulling member.

12. A core pulling device for an annular article, said device comprising a slotted table, a circular set of radially-positioned rollers mounted on said table, a pair of spaced-apart, upwardly projecting members mounted on said table adapted freely to receive and to engage the inner periphery of an annular article mounted on said rollers to hold it against the pulling force, a lever pivoted beneath said table and projecting upward through the slot thereof, means for connecting the projecting end of said lever with a core in said article, and means for moving said lever.

In witness whereof I have hereunto set my hand this 4 day of March, 1922.

JOHN M. STRAUB.